(12) United States Patent
Bittlingmaier (10) Patent No.: US 11,428,302 B1
(45) Date of Patent: Aug. 30, 2022

(54) AXLE DRIVE

(71) Applicant: Kessler & Co. GmbH & Co. KG, Abtsgmünd (DE)

(72) Inventor: Günter Bittlingmaier, Aalen-Ebnat (DE)

(73) Assignee: KESSLER & CO. GMBH & CO. KG, Abtsgmünd (DE)

( * ) Notice: Subject to any disclaimer, the term of this patent is extended or adjusted under 35 U.S.C. 154(b) by 0 days.

(21) Appl. No.: 17/213,336

(22) Filed: Mar. 26, 2021

(30) Foreign Application Priority Data

Apr. 1, 2020 (DE) .......................... 102020109097.8

(51) Int. Cl.
  *F16H 48/08* (2006.01)
  *B60K 17/16* (2006.01)
  *B60K 1/00* (2006.01)
  *F16H 57/04* (2010.01)

(52) U.S. Cl.
  CPC ............. *F16H 48/08* (2013.01); *B60K 17/16* (2013.01); *F16H 57/045* (2013.01); *B60K 2001/001* (2013.01)

(58) Field of Classification Search
  CPC ....... F16H 48/08; F16H 57/045; B60K 17/16; B60K 2001/001
  See application file for complete search history.

(56) References Cited

U.S. PATENT DOCUMENTS 5,352,164 A * 10/1994 Bensinger ................ B60K 6/52
  903/909
9,242,544 B2 1/2016 Kochidomari et al.
11,054,023 B2 * 7/2021 Ohlig ...................... F16H 48/10
2011/0289896 A1 12/2011 Sasahara et al.
2013/0019707 A1 1/2013 Ebihara et al.
2017/0320384 A1 * 11/2017 Kochidomari ....... B60K 17/043
2018/0297401 A1 10/2018 Liu et al.
2018/0345786 A1 * 12/2018 Kucharski ............. B60B 35/122
2020/0124168 A1 * 4/2020 Ohlig .................. F16H 63/3466

FOREIGN PATENT DOCUMENTS

| CN | 101311578 A | 11/2008 |
| DE | 6608688 U | 11/1971 |
| DE | 102006027901 A1 | 2/2008 |
| DE | 102011018861 A1 | 10/2012 |
| DE | 102017110941 A1 | 11/2018 |
| DE | 102017110942 A1 | 11/2018 |
| DE | 102018211555 A1 | 1/2020 |

* cited by examiner

*Primary Examiner* — Tinh Dang
(74) *Attorney, Agent, or Firm* — Dickinson Wright PLLC (57) ABSTRACT

An axle drive for a vehicle comprising at least one drivable vehicle axle comprises a drive shaft that extends along a longitudinal direction of the vehicle, starting from a first side of the axle drive, to a second side of the axle drive and that is configured to receive drive power from an electric motor arranged at the first side and to output said drive power at the second side to a driven shaft that extends at the second side of the axle drive offset from the drive shaft and that is configured to output drive power to the vehicle axle via a bevel gear facing towards the first side. The axle drive further comprises a brake, in particular a parking brake, comprising a brake disk that is arranged at the second side of the axle drive, in a manner facing away from the first side, at the drive shaft or at the driven shaft.

23 Claims, 7 Drawing Sheets

AXLE DRIVE

CROSS-REFERENCE TO RELATED APPLICATION

This application claims priority to German Patent Application No. 10 2020 109 097.8 filed on Apr. 1, 2020, the entire contents of which are incorporated herein by reference.

The invention relates to an axle drive for a vehicle comprising at least one drivable vehicle axle oriented transversely to a longitudinal direction of the vehicle.

Such an axle drive may be provided to conduct drive power generated by a motor, in particular an electric motor, to the vehicle axle in order to drive the vehicle axle and to be able to set the vehicle in motion. In this respect, the axle drive may in particular be arranged at a lower side of the vehicle in the region of the vehicle axle.

In addition to the transmission of drive power, it may also be necessary to equip a vehicle with a parking brake function to be able to ensure a reliable standstill of the vehicle and secure the vehicle against rolling away. Brakes having a parking brake function may in particular be provided in commercial vehicles, such as trucks, fork-lift trucks or dump trucks, to securely hold the vehicles during a loading. Due to the high loads that occur in so doing, in particular on a loading on relatively steep terrain, such a brake has to be able to develop a correspondingly high braking effect. Therefore, in particular in said commercial vehicles, it is usually not possible to implement the parking brake function via the service brake (operating brake), but an additional brake is rather required.

It is generally conceivable to provide a brake at the axle drive of the vehicle to prevent a rotation of the vehicle axle by blocking the axle drive when the vehicle is stationary. Such a brake may in particular also perform an emergency braking function in addition to the typical service brakes of the vehicle, for example, when it closes automatically on a drop in operating pressure. However, there is the problem with respect to an installation of a brake at an axle drive that the installation space in the region of the vehicle axle is extremely limited and is frequently already at least largely occupied by the components of the axle drive for transmitting the drive power. The design of the axle drive with a brake may in particular be made more difficult on the use of electric motors that may be directly connected to the axle drive and that therefore likewise occupy some of the installation space in the region in question.

Furthermore, such brakes may frequently comprise a brake disk that in particular has to have a relatively large diameter on the use for loaded or to be loaded commercial vehicles to be able to develop a sufficient braking effect for stopping the vehicle. However, in view of the limited installation space, it is precisely such large brake disks that may stand in the way of a design of the axle drive with a brake. Nevertheless, a parking brake function is absolutely necessary for some applications or at some vehicles.

It is therefore an object of the invention to provide an axle drive comprising a brake, in particular for holding a vehicle at a standstill, that has as compact a design as possible.

This object is satisfied by an axle drive having the features of claim 1 and in particular in that the axle drive comprises a drive shaft that extends along the longitudinal direction of the vehicle, starting from a first side of the axle drive, across the vehicle axle to a second side of the axle drive, wherein the drive shaft is configured to receive drive power at an input section from an electric motor arranged at the first side of the axle drive and to output the drive power at the second side of the axle drive via an output section; in that the axle drive comprises a driven shaft that extends at the second side of the axle drive offset from the drive shaft in parallel with the longitudinal direction of the vehicle between a first end and a second end opposite thereto, wherein the first end of the driven shaft faces in the direction of the first side of the axle drive, and wherein the driven shaft is configured to receive drive power at an input section from the output section of the drive shaft and to output said drive power to the vehicle axle via a bevel gear arranged at the first end; and in that the axle drive comprises a brake, in particular a parking brake, comprising a brake disk that is rotatable around an axis parallel to the longitudinal direction and that is arranged at the second side of the axle drive, in a manner facing away from the first side of the axle drive, at the drive shaft or at the driven shaft.

Since the drive shaft and the driven shaft extend along the longitudinal direction of the vehicle, the extent of the axle drive may initially also be concentrated on this direction. Furthermore, the electric motor may become or be connected to the axle drive at the first side of the axle drive to transmit drive power to the input section of the drive shaft, while the brake disk is arranged at the second side of the axle drive and in a manner facing away from the first side of the axle drive. The electric motor and the brake disk are thus arranged at mutually opposite sides of the axle drive so that these components, which are so-to-say to be understood as additional components of the axle drive, and the installation space occupied by these components may be distributed over the two sides of the axle drive.

The brake may in particular act as a parking brake and may be provided to reliably secure the vehicle against rolling away when stationary. For this purpose, the brake may, for example, have a brake caliper that engages around the brake disk and that may be configured for holding the brake disk when the vehicle is stationary in order to block a rotation of the brake disk, of the drive shaft or driven shaft connected thereto, and thus also of the vehicle axle coupled to the respective shaft via the bevel gear. The brake caliper may in this respect in particular engage at a section of the brake disk that is a radially outer section with respect to that one of the drive shaft and the driven shaft to which the brake disk is coupled to be able to apply as large a braking torque as possible or to be able to compensate as large a torque as possible conducted via the vehicle axle to the drive shaft.

Alternatively or additionally to such a brake serving as a parking brake, provision may also be made to equip the axle drive with an emergency braking function by way of the brake. For example, a brake caliper may be able to be actively brought out of engagement with the brake disk during a driving with the vehicle in order to enable a rotation of the brake disk, while, on the absence of the required action or of a signal necessary therefor, the brake caliper may automatically come into engagement with the brake disk to brake the vehicle. For this purpose, the brake caliper may in particular comprise a piston that may be or is acted on by pressure during the travel, wherein the brake caliper may automatically come into engagement with the brake disk on the absence of the pressure acting on the piston. On a possible failure of a vehicle system or of a motor providing energy for generating the pressure, for example of the electric motor for driving the vehicle axle, an engagement of the brake caliper into the brake disk and a braking of the vehicle resulting therefrom may thereby be automatically achieved so that the vehicle may be reliably secured against such failures and quickly brought to a standstill in emergency situations. Such a brake provided as an emergency brake may generally also be used or understood as a parking brake in that the action for releasing the brake caliper may in particular also be deliberately omitted when the vehicle is stationary in order to secure the vehicle against rolling away in the sense of a parking brake.

Furthermore, since the first end of the driven shaft with the bevel gear arranged thereat faces towards the first side of the axle drive, the electric motor and the brake disk may be positioned at different sides of the vehicle axle in the installed state of the axle drive. The installation space occupied by these components may accordingly be distributed over the two sides of the vehicle axle, for example a region in front of a front axle and a region between a front axle and a rear axle, so that the design of the axle drive with a brake using an electric motor for generating the drive power is not accompanied by a disproportionate increase in the occupied installation space in one of said regions.

For example, it may be necessary to keep the space between two vehicle axles in an articulated joint vehicle as free as possible in order to enable large kink angles and driving through tight bends. In such a vehicle, the axle drive may in particular be installed such that only one brake disk, which is narrow in the longitudinal direction, is arranged between the vehicle axles and does not stand in the way of reaching large kink angles. The electric motor may, in contrast, be arranged in front of a front axle or behind a rear axle, that is not between the vehicle axles, so that the electric motor does not restrict a pivoting of the vehicle axles with respect to one another. Due to the skillful distribution of the components of the axle drive over both sides of the vehicle axles, it may thus be achieved to equip such a vehicle with a brake having a reliable parking brake function without the arrangement of the axle drive being accompanied by a restriction of the operability of the vehicle.

Furthermore, due to their parallel offset from one another, the drive shaft and the driven shaft may be coupled to one another in a simple manner via a reduction stage in order to transmit a rotational speed of the drive shaft in a reduced or slowed down manner from the output section of the drive shaft to the input section of the driven shaft. In particular on the use of compact and fast-rotating electric motors for generating the drive power, such a reduction stage may be provided to be able to transmit the rotational speed, which is transmitted from the electric motor to the drive shaft, in a reduced manner to the vehicle axle and thereby, for example, to be able to achieve the required torques for driving a loaded vehicle.

The drive shaft may in particular extend from a first end to a second end, wherein the input section of the drive shaft may be formed by the first end of the drive shaft. The output section of the drive shaft may further in particular be provided at its second end and may accordingly be arranged just opposite the input section with respect to the longitudinal direction of the vehicle. In this respect, the input section of the driven shaft may be provided between the first end and the second end of the driven shaft, viewed along the longitudinal direction, and the second end of the driven shaft may project beyond the second end of the drive shaft. In such an arrangement, the brake disk may be rotationally fixedly and brake-effectively connected to the second end of the driven shaft.

Furthermore, the drive shaft may extend from a first end to a second end, wherein the input section of the drive shaft may be formed by the first end of the drive shaft and the brake disk may be arranged at the second end of the drive shaft. Consequently, the output section of the drive shaft may be arranged between the first end of the drive shaft and the second end of the drive shaft. The input section of the driven shaft may in this respect in particular be formed by its second end so that the driven shaft may extend between the input section and the bevel gear. Accordingly, the second end of the drive shaft may project beyond the second end of the driven shaft to be able to arrange the brake disk there.

Since the output section of the drive shaft may be arranged at the second end of the drive shaft or the input section of the driven shaft may be arranged at the second end of the driven shaft, a minimum extent of that one of the drive shaft and the driven shaft at which the brake disk is not arranged may be achieved. Only that one of the drive shaft and the driven shaft at which the brake disk is arranged may extend slightly beyond the second end of the respective other one of the drive shaft and the driven shaft to be able to arrange the brake disk at the second side of the axle drive and opposite the electric motor. The axle drive may thereby be designed as particularly compact along the longitudinal direction of the vehicle. The brake disk may generally be rotationally fixedly and brake-effectively connected to the drive shaft or the driven shaft.

The drive shaft may be formed in multiple parts, for example, in order to transmit the rotational speed of the electric motor, received via the input section, reduced or slowed down to the output section and via the output section to the drive shaft. On the one hand, increased torques may thereby be transmitted to the driven shaft and, on the other hand, the waste heat generated by the drive shaft may in particular be reduced by the slowed-down rotation of at least one part of the drive shaft on the use of fast-rotating electric motors for generating the drive power. Furthermore, due to such a speed reduction, a rotation of a brake disk arranged at a second end of the drive shaft at the second side of the axle drive may also be slowed down in operation, whereby vibrations of the brake disk resulting in noise formations or possibly in damage to the axle drive may in particular be minimized.

Equally, provision may be made with respect to an arrangement of the brake disk at the driven shaft to couple the drive shaft and the driven shaft to one another via a reduction stage in order, again, to be able to achieve an improved acoustic behavior of the brake disk and the application of greater torques to the vehicle axle. The braking torque to be applied may indeed also be increased by such a speed reduction, but larger brake disks or brake disks having a larger diameter may be used due to the improved acoustic behavior of the brake disk so that the required braking torques may be applied without problem.

The first end and the second end of the driven shaft are preferably coupled to one another for a common rotation so that they always have the same rotational speed. The driven shaft may in particular be formed in one part for this purpose.

When the brake disk is arranged at the driven shaft, it is further preferred that the brake disk and the first end of the driven shaft are coupled to one another for a common rotation. For this purpose, the brake disk may in particular be fastened to a brake section of the driven shaft that is formed in one part with the first end of the driven shaft. This brake section may in particular be the second end of the driven shaft. In this way, the torque applied to the bevel gear may substantially be directly absorbed by the brake disk on a braking.

Further embodiments of the invention can be seen from the dependent claims, from the description, and from the Figures.

In some embodiments, the axle drive may further comprise the electric motor. The drive shaft may in this respect in particular be arranged coaxially to an output of the electric motor and may be configured to receive drive power, which is generated by the electric motor, at the input section from the output of the electric motor. In this respect, the input section of the drive shaft may be formed by a first end of the drive shaft, which is arranged at the first side of the axle drive, and it may be directly coupled to the output of the electric motor. This may make it possible to connect the axle drive, with an already installed electric motor included by the axle drive, as a compact and preassembled unit to the vehicle axle to be able to facilitate and accelerate the installation.

In some embodiments, the output section of the drive shaft and/or the input section of the driven shaft may be arranged between the first end of the driven shaft and the brake disk with respect to the longitudinal direction. In this respect, a drive power flow from the input section of the drive shaft to the output section of the drive shaft may run antiparallel to a drive power flow from the input section of the driven shaft to the first end of the driven shaft. Accordingly, a drive power flow through the axle drive may be reversed at the output section of the drive shaft or at its connection to the input section of the driven shaft. The output section of the drive shaft and the input section of the driven shaft may in particular have the same axial position with respect to the longitudinal direction. For example, the drive shaft and the driven shaft may for this purpose be coupled to one another via a spur gear set and thus via at least two gear wheels, in particular exactly two gear wheels, in engagement with one another.

A drive power flow from the input section of the drive shaft through the axle drive to the first end of the driven shaft or to the bevel gear arranged thereat may in particular first run along the drive shaft beyond the vehicle axle and may be guided by the driven shaft against the direction of the drive power flow at the drive shaft back to the vehicle axle. This conducting of the drive power flow starting from the electric motor beyond the vehicle axle may in particular make it possible to brake-effectively connect the brake disk to the drive shaft or the driven shaft at the side of the vehicle axle that is the opposite side with respect to the electric motor and to distribute the components of the axle drive uniformly over the two sides of the vehicle axle.

Furthermore, in some embodiments, the output section of the drive shaft and the input section of the driven shaft may be coupled drive-wise to one another such that a speed reduction takes place on the transmission of the drive power from the drive shaft to the driven shaft. Provision may thus be made that the rotational speed of the drive shaft is transmitted slowed down to the driven shaft. On the use of a fast-rotating electric motor, a fast rotation of the drive shaft may thereby in particular be transmitted slowed down to the driven shaft and via the latter or the bevel gear to the vehicle axle. The required torques may thereby also be transmitted to the vehicle axle on the use of fast-rotating and compact electric motors so that the expansion of the unit comprising the axle drive and the electric motor may be minimized. Furthermore, the rotation of a brake disk arranged at the second end of the driven shaft may also be correspondingly slowed down to be able to minimize vibrations of the brake disk and a noise generation caused by them.

In some embodiments, the output section of the drive shaft and the input section of the driven shaft are coupled drive-wise to one another via at least one spur gear set. Provision may in particular be made that the output section of the drive shaft and the input section of the driven shaft are coupled drive-wise to one another via exactly one spur gear set. A simple and reliable coupling of the drive shaft and of the driven shaft may thereby be achieved with a very small number of components so that the expansion and complexity of the axle drive as well as any power losses may be minimized on the transmission. In particular, the spur gear set may in this respect in particular be formed such that, or gear wheels of the spur gear set may be selected such that, a transmission of the rotational speed of the drive shaft takes place slowed down at the spur gear set.

In some embodiments, the brake disk may be arranged at the second end of the driven shaft. Provision may in this respect in particular be made that the rotational speed of the drive shaft at its output section is transmitted slowed down to the input section of the driven shaft or that the drive shaft and the driven shaft are connected to one another via a reduction stage, in particular a spur gear set. It may thereby be achieved that the driven shaft and thus also the brake disk arranged at the second end of the driven shaft may rotate slowed down, which may in particular improve the acoustic behavior of the brake disk and reduce vibrations of the brake disk during operation.

Furthermore, in such embodiments, the second end of the driven shaft may project axially beyond the drive shaft with respect to the longitudinal direction of the vehicle, wherein the brake disk may extend radially at least up to and into alignment with the drive shaft. The brake disk arranged at the second end of the driven shaft may thus project radially with respect to the driven shaft beyond the offset between the drive shaft and the driven shaft without being blocked or restricted in diameter by the drive shaft. The radius of the brake disk may correspondingly be larger than the parallel offset of the drive shaft and the driven shaft. The axial projection of the driven shaft beyond the drive shaft, and in particular beyond a second end of the drive shaft, may thus make it possible, with a compact arrangement of the axle drive, to use a brake disk having a relatively large diameter to be able to develop a large braking effect and, for example, to be able to reliably secure commercial vehicles to be loaded against rolling away when stationary.

In some embodiments, the drive shaft may extend along the longitudinal direction of the vehicle between a first end and a second end opposite thereto, wherein the first end of the drive shaft may face towards the first side of the axle drive, and wherein the brake disk may be arranged at the second end of the drive shaft. The electric motor, the drive shaft, and the brake disk may in this respect in particular be arranged coaxially to one another. Furthermore, the second end of the drive shaft may extend beyond the second end of the driven shaft so that the brake disk may extend at least up to and into alignment with the driven shaft. Also due to this axial projection of the driven shaft, the brake disk arranged at the second end of the drive shaft may be formed with a comparatively exceeding radius, which in particular exceeds the offset between the drive shaft and the driven shaft, to be able to develop a sufficiently high braking force. The drive shaft may in particular extend through a housing of the axle drive in the manner of a through drive shaft, wherein the brake disk may be connected to the second end of the drive shaft outside the housing.

Even though the brake disk is described as arranged at the second end of the drive shaft, provision may be made that the drive shaft extends beyond the brake disk in order, for example, to transmit a portion of the drive power generated by the electric motor to a further drivable vehicle axle. In such cases, the brake disk consequently marks a second end of the drive shaft with respect to the axle drive for driving the vehicle axle so that the components for driving this vehicle axle are all arranged between the electric motor and the brake disk, while the part of the drive shaft extending beyond the brake disk and any components arranged thereat or connected thereto may be provided for driving a further vehicle axle. In this respect, the drive shaft extending beyond the brake disk may in particular be formed in multiple parts, but may also be formed in one part.

In some embodiments, the drive shaft may comprise at least a first part shaft and a second part shaft coaxial thereto that are drive-effectively coupled via a reduction gear unit arranged therebetween. This may in particular be provided when the brake disk is connected to a second end of the drive shaft, which may in particular be arranged at the second part shaft, to be able to slow down the rotation of the brake disk in operation.

In such a multi-part design of the drive shaft, in particular the first part shaft may have the input section of the drive shaft to which drive power is transmitted from the electric motor. The second part shaft may, in contrast, have the output section of the drive shaft so that a reduced rotational speed at the output section may already be transmitted to the input section of the driven shaft. The reduction gear unit may consequently transmit a rotational speed of the first part shaft slowed down to the second part shaft. In addition to this speed reduction by the reduction gear unit, provision may be made that the rotational speed of the second part shaft at the output section of the drive shaft is again transmitted reduced to the input section of the driven shaft, for which purpose a coupling of the drive shaft and the driven shaft via a spur gear set may be provided, for example. The reduction gear unit may, for example, be configured as a planetary gear set.

Furthermore, in some embodiments, the reduction gear unit may be shiftable to be able to choose between different transmission stages with respect to the transmission of the rotational speed from the first part shaft to the second part shaft. In this respect, provision may in particular also be made that the rotational speed of the first part shaft is transmitted unchanged to the second part shaft in one of the transmission stages, while a slowed-down transmission or a speed reduction takes place in at least one of the transmission stages. The torque that may be transmitted to the driven shaft and via the driven shaft to the vehicle axle may thereby in particular be adaptable due to the situation.

For example, such a shiftable reduction gear unit may be configured as a planetary gear set comprising a fixedly held ring gear, wherein the second part shaft may be rotationally fixedly coupled to a web on which axles of planet gears revolving around a sun gear are arranged. The first part shaft may in this respect be selectively connectable to the web or to the sun gear, for example by means of a dog clutch, to be able to transmit the rotation of the first part shaft either unchanged or slowed down or reduced to the second part shaft. Alternatively thereto, the reduction gear unit may be configured as a planetary gear set comprising a fixedly held web and the second part shaft may be connected to the ring gear, whereas the first part shaft may be selectively connectable to the ring gear or to the sun gear. It is also possible to connect a plurality of such reduction gear units behind one another to be able to transmit the rotational speed of the first part shaft, in particular selectively, reduced to the second part shaft.

In some embodiments, the axle drive may be configured to be installed in the vehicle such that the drive shaft is arranged vertically offset from the driven shaft, in particular above the driven shaft, and crosses the vehicle axle above the vehicle axis.

Such an installation may in particular enable a compact arrangement of the axle drive, wherein a drive power flow is first guided beyond the vehicle axle and is then conducted back to the vehicle axle via the driven shaft. Thus, the electric motor and the brake disk may be arranged at mutually opposite sides of the vehicle axle. Furthermore, the electric motor, which is in particular arranged coaxially to the drive shaft, and the drive shaft itself may be arranged at a particularly large spacing from the ground due to their crossing of the vehicle axle in order to ensure a sufficient ground clearance and to protect said components from damage as well as possible during a journey with the vehicle.

In some embodiments, the axle drive may comprise a housing in which the drive shaft and the driven shaft may be at least partly received, wherein at least the output section of the drive shaft and the input section of the driven shaft are preferably arranged within the housing. The drive shaft may in this respect in particular be arranged completely within the housing or at most its first end or the input section may extend from the housing for a coupling to an output of the electric motor. In this respect, the brake disk may be connected to the second end of the driven shaft, wherein the second end of the driven shaft may extend from the housing so that the brake disk may be arranged outside the housing and may in particular rotate dry there. Likewise, in particular on an arrangement of the brake disk at the drive shaft, the driven shaft may be completely received in the housing, while the drive shaft may extend from the housing to be able to connect the brake disk outside the housing to the drive shaft.

In some embodiments, an inner space of the housing may further define a common oil chamber for the drive shaft and the driven shaft. This common oil chamber may in particular increase the radiation surface via which waste heat generated by the drive shaft as a result of its fast rotation may be led off.

Furthermore, the axle drive may be configured such that the common oil chamber communicates with an axle chamber in which a ring gear meshing with the bevel gear is arranged. Said radiation surface may thereby in particular also be extended and a lubrication of the drive shaft and of the driven shaft via a gear drive and a wiper into a reservoir may be achieved without a pump being necessary for this purpose.

In some embodiments, the housing may have a bearing section which is integrally formed in one part and at which bearings for supporting the drive shaft and/or the driven shaft are supported, wherein the housing has an axle chamber housing section which is connected to the bearing section, into which the bevel gear projects, and/or in which a ring gear meshing with the bevel gear is received. The ring gear may in particular be the already mentioned ring gear that is arranged in the axle chamber.

Bearings may in particular be supported at the bearing section integrally formed in one part, said bearings being provided at both sides of the output section of the drive shaft and/or at both sides of the input section of the driven shaft with respect to the longitudinal direction of the vehicle. Since the bearing section may be integrally formed in one part and may be formed as a single materially bonded part, the support points may be oriented exactly in alignment with one another in order in particular to be able to align and support the fast-rotating drive shaft precisely in parallel with the longitudinal direction of the vehicle. The bearings may in this respect in particular be configured as rolling element bearings. The axle chamber housing section may furthermore form a component which is separate from the bearing section, which may, for example, be connected by screws to the bearing section, and in which a ring gear may be arranged to transmit the drive power to the vehicle axle.

Furthermore, the output section of the drive shaft and the input section of the driven shaft may be arranged within the bearing section. The transmission of the drive power from the drive shaft to the driven shaft may consequently take place within the bearing section. The drive shaft and the driven shaft may in this respect in particular be supported via respective bearings at the bearing section at both sides of the output section of the drive shaft or of the input section of the driven shaft with respect to the longitudinal direction of the vehicle.

The input section of the drive shaft may be arranged within the axle chamber housing section or may be arranged thereat. In this respect, the axle chamber housing section may form a connection for the electric motor so that drive power generated by the electric motor may be transmitted to the input section of the drive shaft that is arranged within or at the axle chamber housing section. The axle chamber housing section may in particular also support at least one bearing for supporting the drive shaft to align the input section of said drive shaft with an electric motor connected to the axle chamber housing section.

Furthermore, the drive shaft may pass through the axle chamber housing section. The axle chamber housing section may thus in particular have a connection section for fastening the electric motor, wherein the input section of the drive shaft may be located within the axle chamber housing section or at the axle chamber housing section to receive the drive power generated by the electric motor. The electric motor may in this respect be arranged coaxially to the drive shaft and an output of the electric motor may be directly connected to the input section of the drive shaft. The drive shaft may pass through the axle chamber housing section and may, for example, cross the vehicle axle in order, at the second side of the axle drive, to transmit drive power via the output section to the input section of the driven shaft. The output section of the input shaft and the input section of the driven shaft may be arranged in the already mentioned bearing section within which the transmission of drive power to the driven shaft may consequently take place.

In some embodiments, at least one bearing for supporting the drive shaft may be supported at the axle chamber housing section. This may in particular enable an exact alignment with an electric motor fastened to the axle chamber housing section.

In some embodiments, the housing may have a connection section for fastening the electric motor. This connection section may in particular be provided at the axle chamber housing section. The electric motor may thus be installed directly at the first side of the axle drive via this connection section in order to transmit drive power to the input section of the drive shaft.

In some embodiments, the axle drive may further comprise a differential for distributing at least a respective portion of the drive power to two half-shafts of the vehicle axle, wherein the ring gear may be rotationally fixedly coupled to the differential. The differential may in particular be configured as a bevel differential, wherein the ring gear may be rotationally fixedly connected to a differential cage of the differential and may in particular be formed in one part with the differential cage. Due to such a differential, the drive power may be transmitted as required to the two half-shafts of the vehicle axle in order, for example, to enable a faster rotation of a wheel that is connected to one of the half-shafts and that is outwardly disposed during the driving through of a bend.

In some embodiments, the brake disk may be arranged outside the housing. Consequently, the brake disk may rotate dry and the brake may thus be designed as a dry and low-wear brake, wherein higher efficiencies, in particular in comparison to wet-running multi-disk parking brakes, may be achieved by such a dry brake. Furthermore, the brake disk may be connected or connectable to the drive shaft or the driven shaft outside the housing so that service work may, for example, take place without having to open or disassemble the housing. A replacement of a worn brake disk may also take place without having to open the housing. Accordingly, that one of the drive shaft and the driven shaft at which the brake disk is arranged may project from the housing. The brake disk may in particular be connected directly or via a holder to the drive shaft or the driven shaft.

In some embodiments, the brake may comprise a brake caliper that is fastened to an outer side of the housing. The brake caliper may thus also be accessible from outside the housing to be able to service the brake. The axle drive may in this respect in particular be configured to be installed such that the brake caliper is arranged vertically above the brake disk. This may make it possible to remove the brake disk from below the vehicle from a respective one of the drive shaft or the driven shaft and, for example, to replace a worn brake disk.

The brake may in particular comprise a single brake disk that is engaged around by the brake caliper. This may enable a simple and space-saving design of the brake.

In some embodiments, the brake caliper may be floatingly supported at the housing. Heat-induced expansions of the brake disk during operation may thus in particular be able to be tolerated and an unwanted blocking or rubbing of the brake disk during operation may be prevented.

Furthermore, the axle drive may comprise a ring gear that meshes with the bevel gear. In this respect, the axle drive may comprise at least one half-shaft of the vehicle axle, wherein the ring gear may be rotationally fixedly coupled to the half-shaft. In this respect, the drive power may consequently be directly transmitted to the respective half-shaft of the vehicle axle via the bevel gear and the ring gear, wherein a second axle drive may in particular be provided for driving a second half-shaft of the vehicle axle. In this respect, different rotational speeds may, for example, also be transmitted to the wheels during a driving through of a bend by controlling the respective electric motors of the axle drives as required.

The invention will be explained in the following purely by way of example with reference to embodiments and to the drawings.

There are shown.

Figure 1:
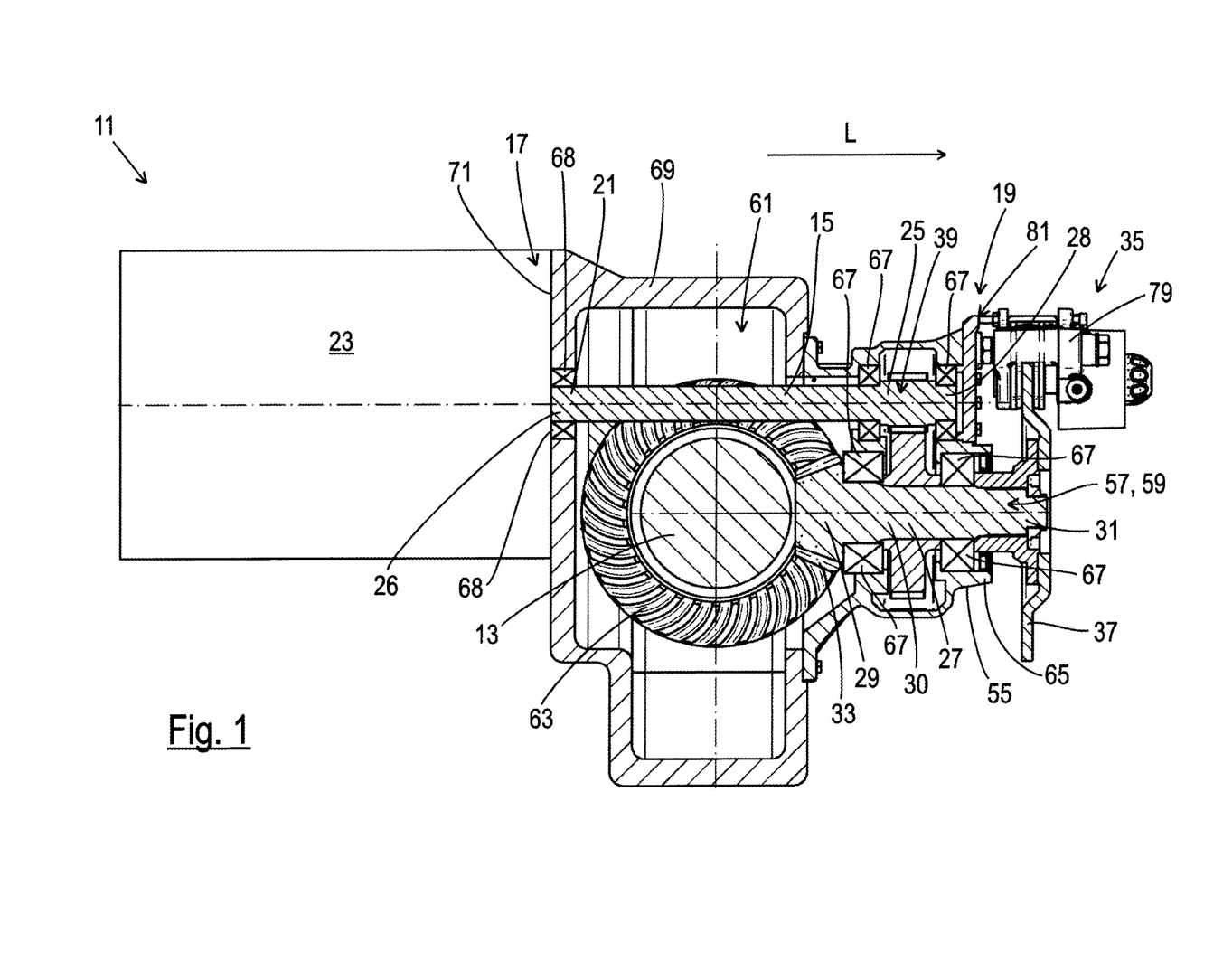
FIG. 1 a representation of an axle drive for driving a vehicle axle that comprises a brake.

FIG. 1 shows an axle drive 11 for driving a vehicle axle 13 of a vehicle. The axle drive 11 has a drive shaft 15 that extends along a longitudinal direction L of the vehicle, which is oriented transversely and in particular perpendicular to the vehicle axle 13, and that extends across the vehicle axle 13 to a second side 19 of the axle drive 11, starting from a first side 17 of the axle drive 11.

The drive shaft 15 is configured to receive drive power at an input section 21 from an electric motor 23 arranged at the first side 17 of the axle drive 11. The electric motor 23 is in this respect arranged coaxially to the drive shaft 15 and the drive shaft 15 or its input section 21 may in particular be directly connected to a non-visible output of the electric motor 23. Consequently, the input section 21 of the drive shaft 15 may rotate at the rotational speed of the output of the electric motor 23 during operation.

The drive shaft 15 extends from the first side 17 of the axle drive 11 or from a first end 26 of the drive shaft 15 to the second side 19 of the axle drive 11 and to a second end 28 of the drive shaft 15. At the second end 28, the drive shaft 15 has an output section 25 to transmit received drive power at the second side 19 of the axle drive 11 to an input section 30 of a driven shaft 27. For this purpose, the driven shaft 27 is connected to the drive shaft 15 via a spur gear set 39 and extends offset in parallel from the drive shaft 15 along the longitudinal direction L.

In this respect, the driven shaft 27 extends between a first end 29 and a second end 31, wherein a bevel gear 33 is arranged at the first end 29 and meshes with a ring gear 63 to transmit drive power to the vehicle axle 13. The input section 30 of the driven shaft 27 is arranged between the first end 29 and the second end 31 of the driven shaft 27 and the spur gear set 39 for transmitting the drive power to the input section 30 of the driven shaft 27 is configured such that a rotational speed of the drive shaft 15 is transmitted reduced or slowed down to the driven shaft 27. In particular on a use of fast-rotating and compact electric motors 23, it may be achieved by this speed reduction to be able to transmit sufficiently large torques for driving heavily loaded commercial vehicles to the vehicle axle 13 via the bevel gear 33 arranged at the first end 29 of the driven shaft 27. Furthermore, the spur gear set 39 makes it possible in a particularly simple and compact manner to transmit drive power from the drive shaft 15 to the driven shaft 27 without large power losses.

A brake disk 37 of a brake 35 is furthermore arranged at the second end 31 of the driven shaft 27. The brake disk 37 is thus arranged at the second side 19 of the axle drive 11 and opposite the electric motor 23 with respect to the longitudinal direction L of the vehicle, wherein the axle drive 11 is configured such that the drive shaft 15 crosses the vehicle axle 13 in the installed state. In this respect, a drive power flow through the axle drive 11 reverses at the spur gear set 39 so that a drive power flow from the input section 30 of the driven shaft 27 to the bevel gear 33 runs antiparallel to a drive power flow from the input section 21 of the drive shaft 15 to its output section 25.

The brake 35 in this respect acts as a parking brake and is provided to reliably secure the vehicle against rolling away when stationary by an engagement of a brake caliper 79 into the brake disk 37. In addition, the brake 35 also serves to provide an emergency braking function. For this purpose, the brake caliper 79 may be actively brought out of engagement with the brake disk 37 during the travel, wherein it is configured to automatically come into engagement with the brake disk 37 and to brake the vehicle on a failure or a disturbance of the pressure required for this purpose.

Since the drive power flow is first conducted over the vehicle axle 13 by means of the drive shaft 15, the electric motor 23 and the brake disk 37 may be arranged at different sides of the vehicle axle 13. The components of the axle drive 11 may thus be distributed over the two sides of the vehicle axle 13 without the axle drive 11 taking up a large amount of installation space at a side of the vehicle axle 13 (cf. also FIGS. 2A to 4B). For example, the narrow brake disk 37 may be arranged between a front axle and a rear axle of the vehicle, whereas the electric motor 23 may be arranged in front of the front axle or behind the rear axle and accordingly does not occupy any installation space between the vehicle axles.

Furthermore, due to its arrangement at the second end 31 of the driven shaft 27, the brake disk 37 rotates with the rotation of the driven shaft 27 slowed down with respect to the rotational speed of the drive shaft 15. Vibrations of the brake disk 37 during the operation of the axle drive 11 may thereby be minimized so that disturbing noise formations or possible damage to the axle drive 11 due to such vibrations may be prevented.

The axle drive 11 further comprises a housing 55 within which in particular the output section 25 of the drive shaft 15 and the input section 30 of the driven shaft 27 are arranged. In this respect, the housing 55 has a bearing section 65 which is integrally formed in one part and at which bearings 67 are supported that support both the output section 25 of the drive shaft 15 and the input section 30 of the driven shaft 27 at both sides with respect to the longitudinal direction L. Since the bearing section 65 is in this respect formed as a single materially bonded part, the bearings 67 may be arranged exactly in alignment with one another to align both the drive shaft 15 and the driven shaft 27 precisely in parallel with the longitudinal direction L. Furthermore, an inner space 57 of the housing 55 or of the bearing section 65 forms a common oil chamber 59 for the drive shaft 15 and the driven shaft 27 so that the radiation space for radiating waste heat, which in particular arises due to the fast rotation of the drive shaft 15, may be increased.

In addition to the bearing section 65, the housing 55 has an axle chamber housing section 69, which is connected to the bearing section 65 and in which a ring gear 63 meshing with the bevel gear 33 is arranged, at the first side 17 of the axle drive 11. In this respect, the axle chamber housing section 69 bounds an axle spacing 61 through which the vehicle axle 13 extends. This axle chamber 61 communicates with the common oil chamber 59 formed by the inner space 57 of the bearing section 65 so that the axle chamber 61 provides a further region for radiating waste heat generated as a result of the rotation of the drive shaft 15 and of the driven shaft 27.

The axle chamber housing section 69 further has a connection section 71 for connecting the electric motor 23 to the housing 55 so that the electric motor 23 may be precisely coaxially oriented to the drive shaft 15 and connected to the housing 55. In this respect, the input section 21 of the drive shaft 15 is supported at bearings 68 that are supported at the axle chamber housing section 69. Consequently, the input section 21 is arranged in or at the axle chamber housing section 69 and the drive shaft 15 passes through the axle chamber housing section 69 or the axle chamber 61 to transmit the received drive power within the bearing section 65 via the output section 25 to the input section 30 of the driven shaft 27. In this respect, the drive shaft 15 crosses the vehicle axle 13.

The second end 31 of the driven shaft 27 extends from the housing 55 such that the brake disk 37 connected to the second end 31 of the driven shaft 27 is arranged outside the housing 55. The brake 35 may thus be designed as a dry brake and the brake disk 37 may rotate completely dry. The brake caliper 79, which is connected at an outer side 81 to the housing 55 and is floatingly supported there, is also arranged outside the housing 55. The brake caliper 79 in this respect engages around the brake disk 37 to be able to reliably secure a vehicle against rolling away when stationary by blocking the brake disk 37.

The brake 35 is thus arranged completely outside the housing 55, whereby service work may, for example, be carried out at the brake 35 without having to open or disassemble the housing 55. Furthermore, a worn brake disk 37 may, for example, be replaced without problem with a new brake disk 37, wherein the brake caliper 79 is in particular arranged vertically above the brake disk 37 to be able to remove the brake disk 37 from the lower side of the vehicle. However, the brake caliper 79 may generally be arranged around the brake disk 37 in any desired manner, wherein positions that enable a removal of the brake disk 37 downwardly or from below may facilitate service and repair work. Furthermore, the design of the brake 37 with a dry rotating brake disk 37 makes it possible to achieve high efficiencies and in particular higher efficiencies in comparison with wet-running multi-disk parking brakes.

As FIG. 1 further shows, the second end 31 of the driven shaft 27 extends beyond the drive shaft 15 with respect to the longitudinal direction L of the vehicle so that the brake disk 37 may extend radially with respect to the driven shaft 27 at least up to and into alignment with the drive shaft 15. Consequently, due to this axial overhang of the drive shaft 15, the radius of the brake disk 37 may be greater than the offset between the drive shaft 15 and the driven shaft 27 without the brake disk 37 being blocked by the drive shaft 15. The brake disk 37 may thereby be formed with a relatively large radius to be able to generate braking forces that are as large as possible for securely holding the vehicle at a standstill by means of the brake caliper 79.

Figure 2A:
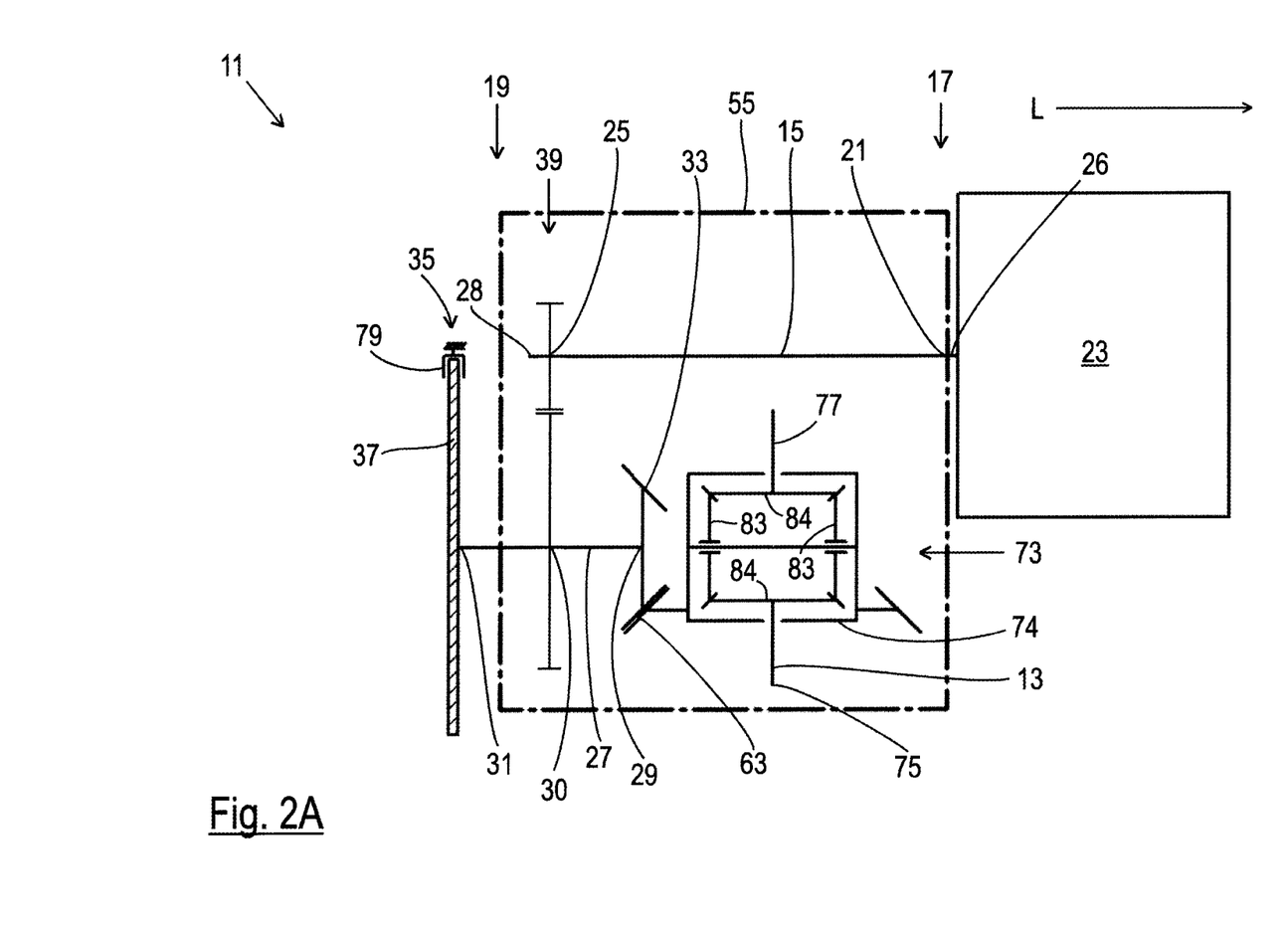
FIGS. 2A and 2B a respective schematic representation of an embodiment of the axle drive and its connection to the vehicle axle.

FIG. 2A shows a schematic representation of the axle drive 11 of FIG. 1 from which it can be seen that the ring gear 63 may be rotationally fixedly connected to a differential cage 74 of a differential 73. In this respect, the differential 73 has a plurality of balancing gears 83 and two side gears 84, wherein the side gears 84 are connected to a respective half-shaft 75 or 77 of the vehicle axle 13. Due to the coupling of the ring gear 63 to the differential 73, the drive power may be transmitted as required to the half-shafts 75 and 77 of the vehicle axle 13 in order, for example, to enable a faster rotation of a wheel arranged at a respective half-shaft 75 or 77 when driving through a bend.

Figure 2B:
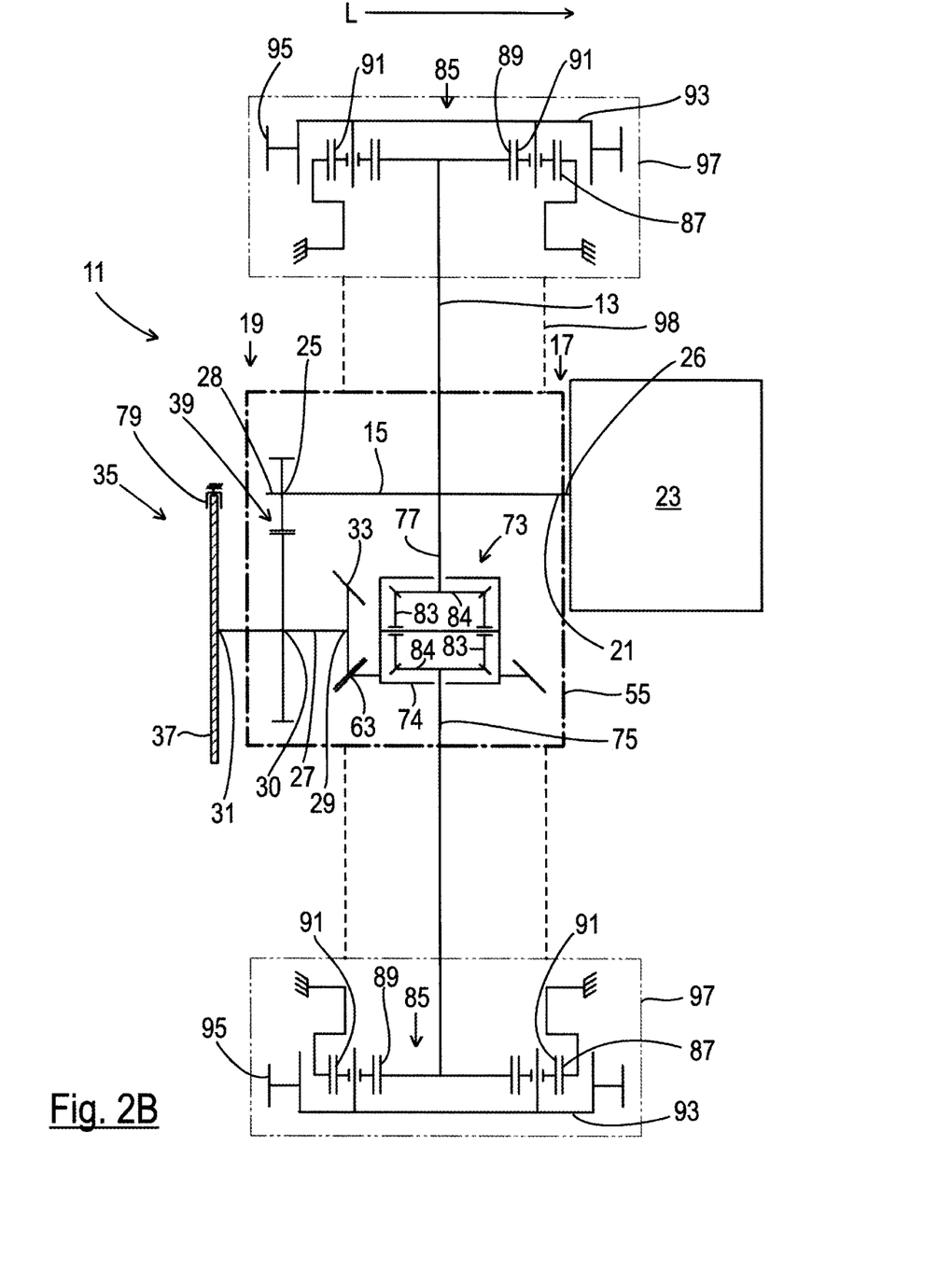

As FIG. 2B shows, the axle drive 11 may be connected as a compact unit to an axle housing 98 within which the vehicle axle 13 extends. In the embodiments shown here, the vehicle axle 13 is configured as an outer planetary axle and has, at its wheel sides 97, a respective planetary gear set 85 by means of which a rotation of the vehicle axle 13 may be transmitted reduced or slowed down to respective wheel hubs 95. It may also be achieved by such a speed reduction to be able to transmit the required torques to the wheels on the use of a fast-rotating electric motor 23.

The planetary gear set 85 in this respect has a sun gear 89 to which the vehicle axle 13 or a respective half-shaft 75 or 77 of the vehicle axle 13 is connected. The sun gear 89 is surrounded by a ring gear 87 that is fixedly held and that is arranged concentrically to the sun gear 85. Furthermore, the planetary gear set 85 has a plurality of planet gears 91 that rotate about axles supported on a web 93 as a result of a rotation of the sun gear 89. In this respect, the web 93 is also set into rotation and is connected to the wheel hub 95, wherein the web 93 rotates slowed down with respect to the sun gear 89 connected to the vehicle axle 13 so that the rotational speed of the vehicle axle 13 may be transmitted slowed down to the wheel hub 95.

Figure 3A:
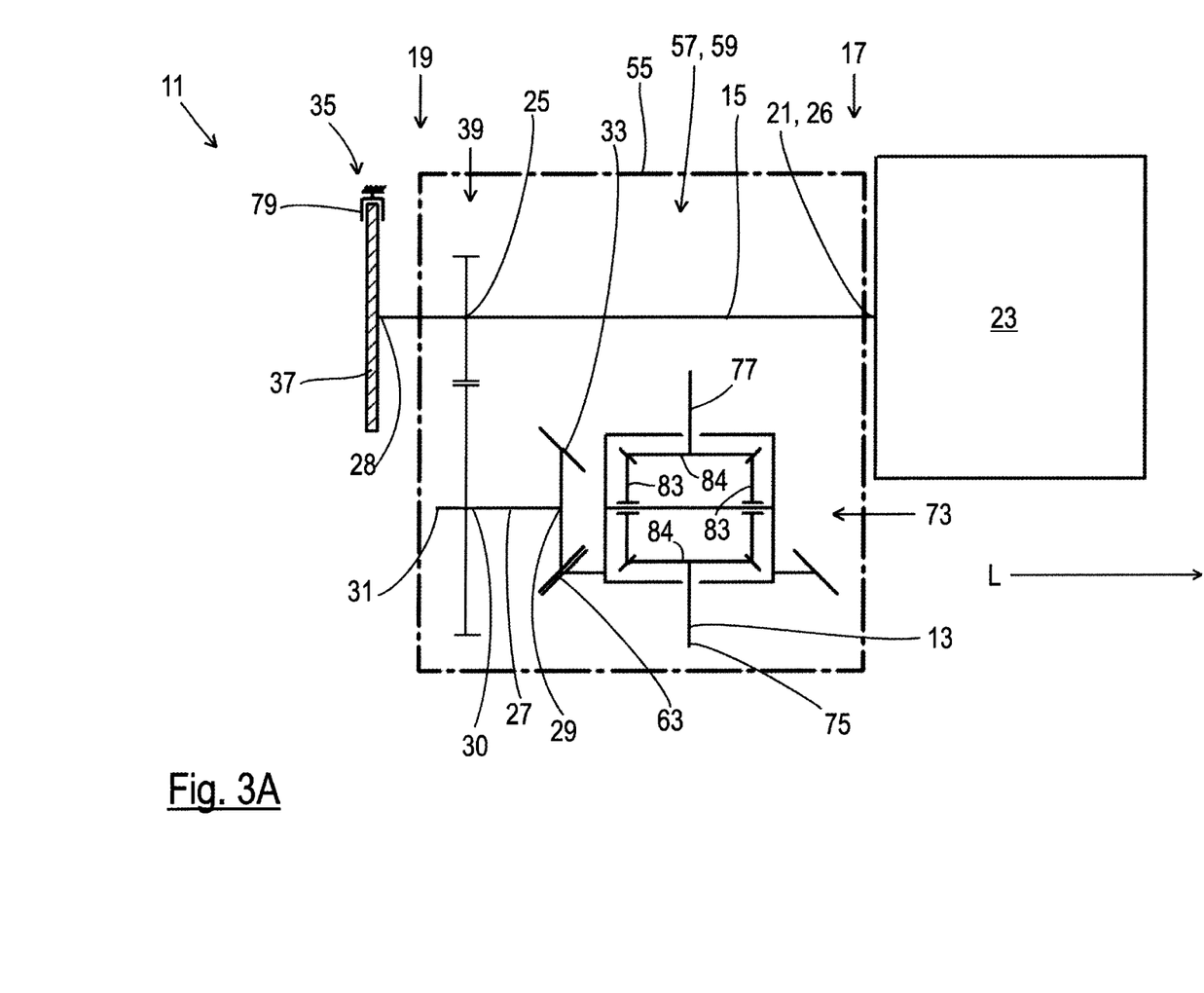
FIGS. 3A and 3B a respective schematic representation of a further embodiment of the axle drive and its connection to the vehicle axle.
Figure 3B:
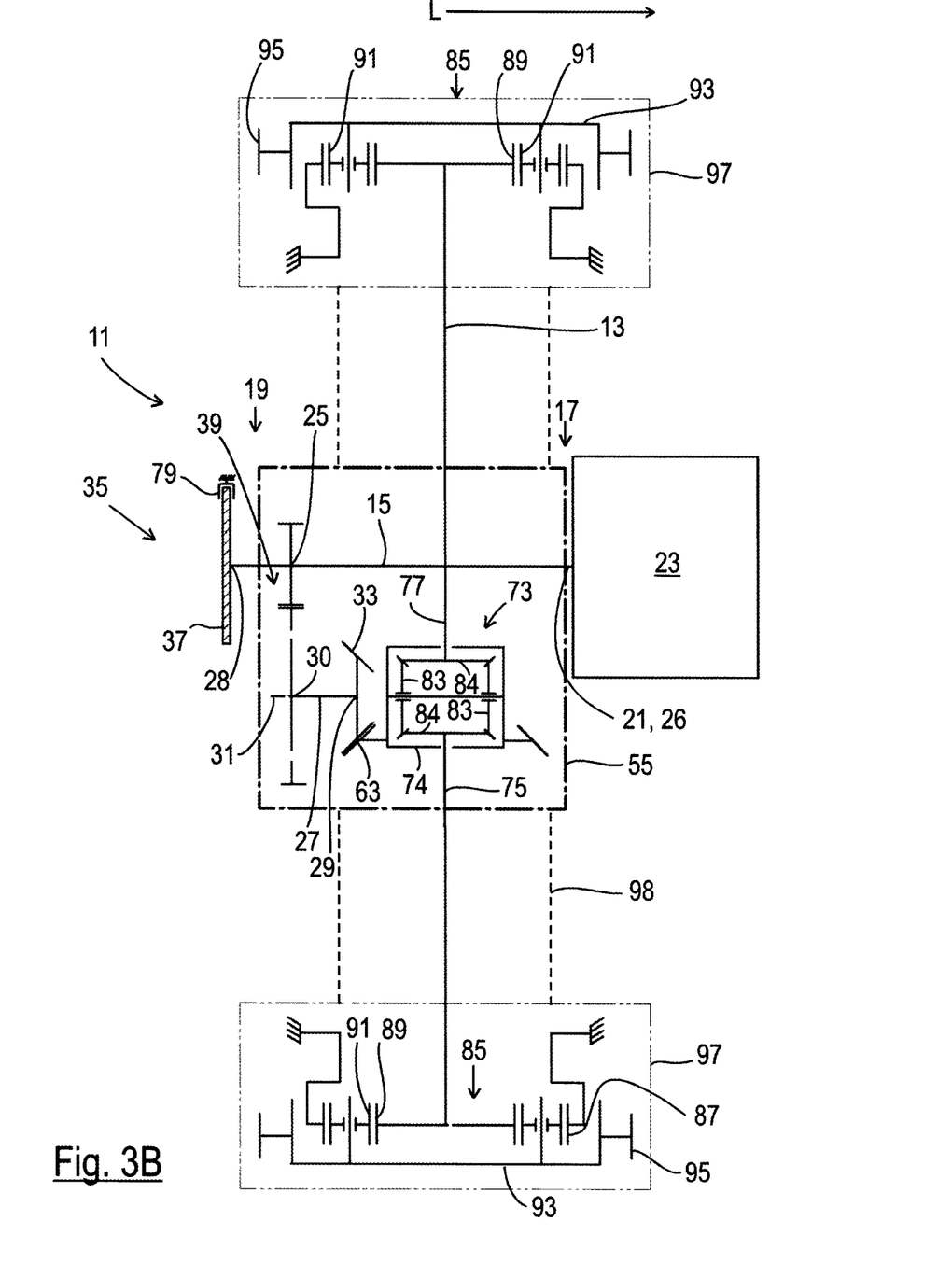

FIGS. 3A and 3B schematically show a further embodiment of the axle drive 11. In this respect, a drive shaft 15 extending along a longitudinal direction L of the vehicle is also provided that receives drive power from an electric motor 23 at an input section 21 and transmits it at an output section 25 to an input section 30 of a driven shaft 27 via a spur gear set 39. A bevel gear 33 is again arranged at a first end of the driven shaft 27 and meshes with a ring gear 63 to transmit the drive power to a differential 73 and via the latter to respective half-shafts 75 and 77 of the vehicle axle 13. Furthermore, this axle drive 11 also has a brake 35 comprising a brake disk 37 and a brake caliper 79.

In contrast to the embodiment of FIGS. 1, 2A and 2B, the brake disk 37 is here, however, not arranged at the driven shaft 27, but the drive shaft 15 rather extends from a housing 55, starting from a first side 17 of the axle drive 11 or from a first end 26, and the brake disk 37 is arranged at a second end 28 of the drive shaft 15 outside the housing 55. The brake 35 may thus again be arranged outside the housing 55 to design the brake 35 as a dry brake and to enable an easy service of the brake 35. Furthermore, the second end 28 of the drive shaft 15 projects over the driven shaft 27 so that the brake disk 37 arranged at the second end 28 may be formed with a larger radius than the offset between the drive shaft 15 and the driven shaft 27. In this respect, the axle drive 11 may also be connected as a compact unit to an axle housing 98, wherein the axle drive 11 may in turn be configured such that the drive shaft 15 crosses the vehicle axle 13 (cf. also FIG. 3B).

Figure 4A:
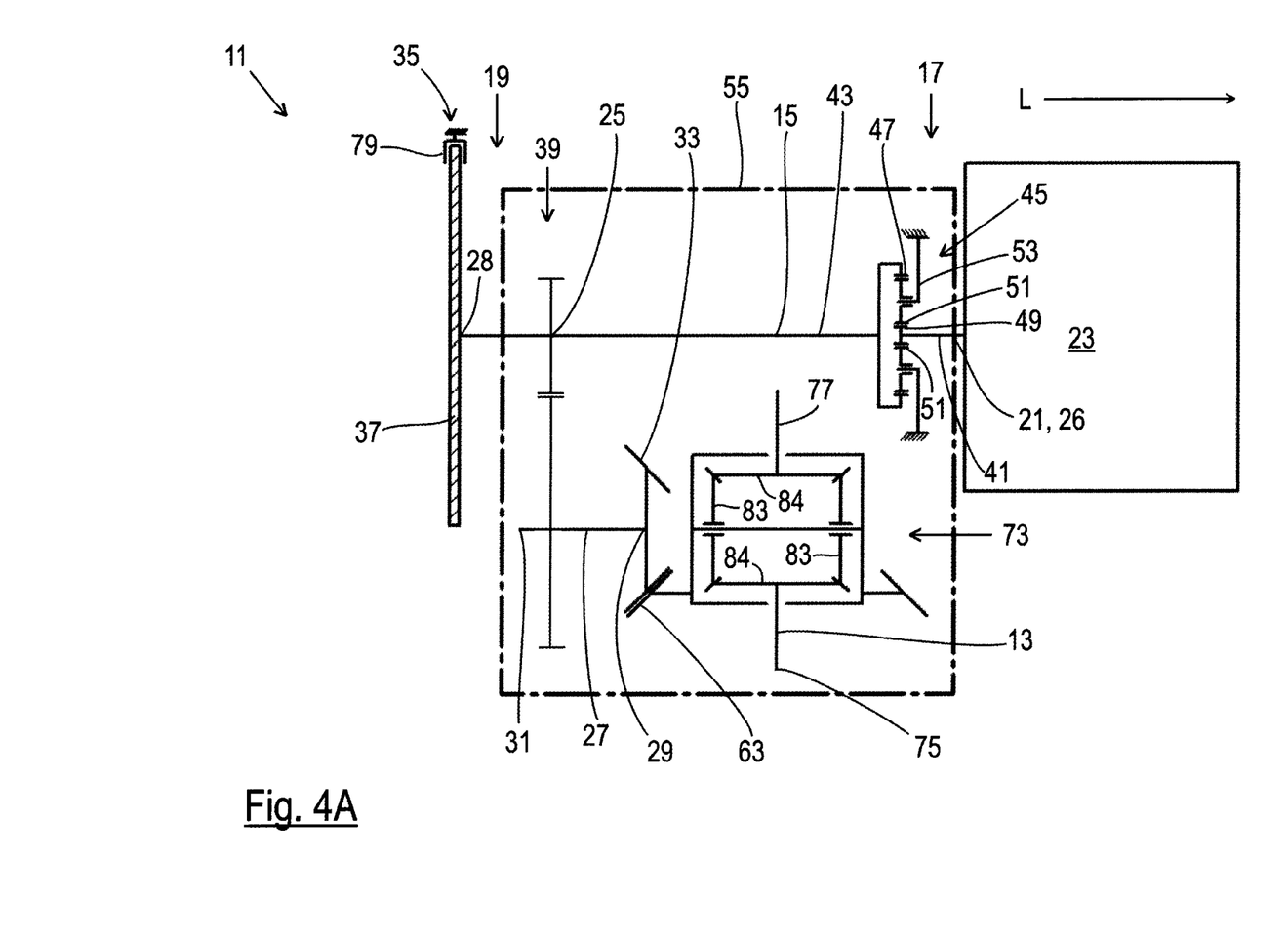
FIGS. 4A and 4B a respective schematic representation of a further embodiment of the axle drive and its connection to the vehicle axle.
Figure 4B:
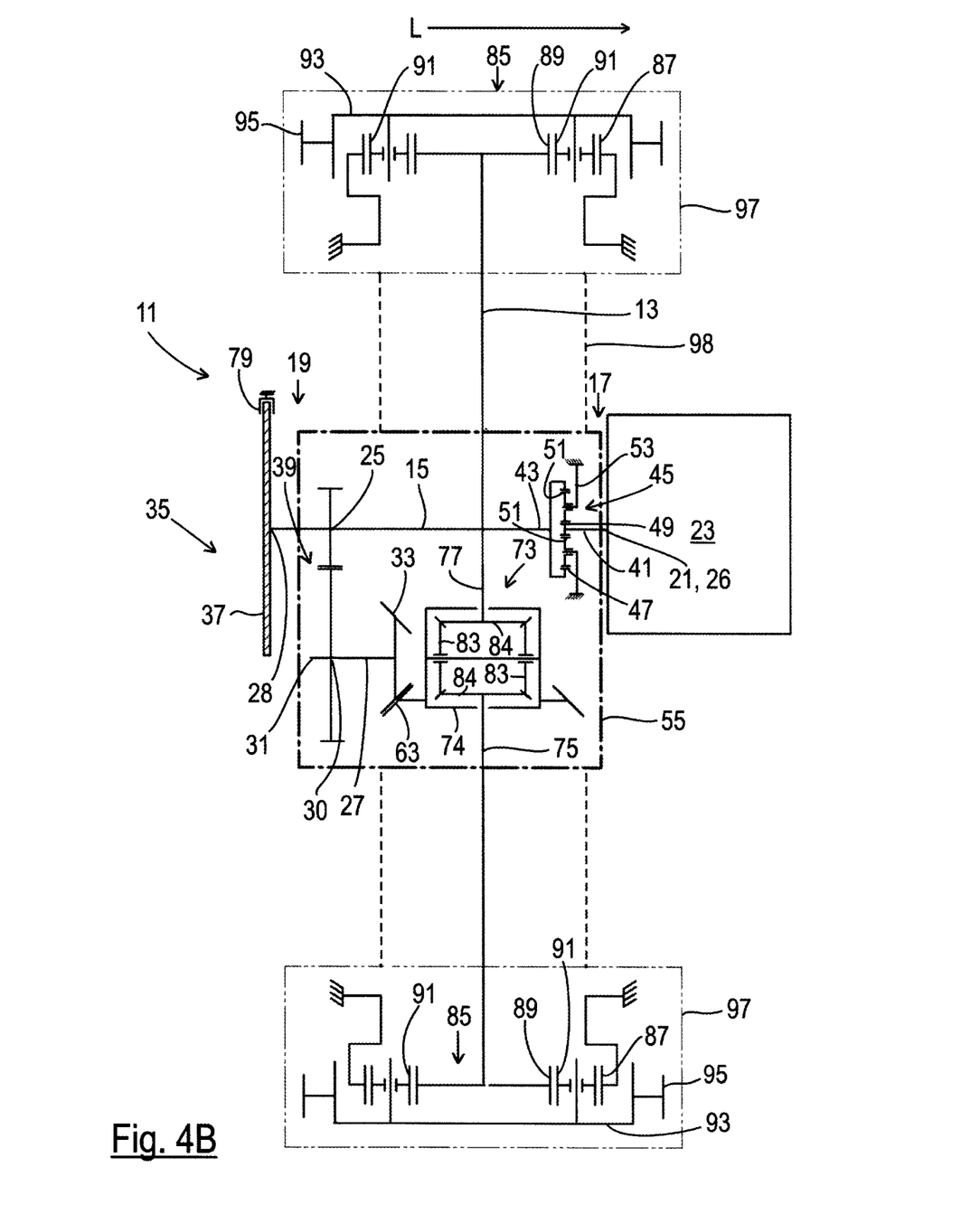

As FIGS. 4A and 4B further show, the drive shaft 15 may, in contrast to the further embodiments shown, also be formed in multiple parts and may have a first part shaft 41 and a second part shaft 43 that are connected to one another via a reduction gear unit 45. In this respect, the first part shaft 41 may have the input section 21 to receive drive power from the electric motor 23, whereas the second part shaft 43 may have the output section 25 and may transmit drive power to the driven shaft 27 or its input section 30. Due to the reduction gear unit 45, the rotational speed of the first part shaft 41 may in this respect be transmitted reduced or slowed down to the second part shaft 43 to be able to achieve an improved handling of the rotational speeds generated by a compact and fast-rotating electric motor 23.

Like the above-described gears 85 of the wheel sides 97, the reduction gear unit 45 is in this respect configured as a planetary gear set, wherein the first part shaft 41 is rotationally fixedly coupled to a sun gear 49. The reduction gear unit 45 also has a plurality of planet gears 51 that rotate about axles arranged on a web 53. In this respect, the web 53 is, however, fixedly held so that a ring gear 47, which is arranged concentrically to the sun gear 49 and to which the second part shaft 43 is connected, may be set in rotation. In this respect, the ring gear 47 and the second part shaft 43 rotate slowed down with respect to the sun gear 49 and the first part shaft 41 connected thereto so that the rotational speed of the first part shaft 41 may be transmitted slowed down to the second part shaft 43.

The drive shaft 15 in turn extends from the housing 55 up to the second side 19 of the axle drive 11 and the brake disk 37 is arranged at the second end 28 of the drive shaft 15. Since the drive power generated by the electric motor 23 is first transmitted to the first part shaft 41 and is then transmitted slowed down to the second part shaft 43, the brake disk 37 also rotates slowed down with respect to the fast-rotating electric motor 23. Vibrations of the brake disk 37 and an unwanted noise formation or damage to the axle drive 11 may thereby in particular be avoided. Furthermore, a sufficiently high torque may be transmitted to the vehicle axle 13 due to the speed reduction at the reduction gear unit 45 and a further reduction at the spur gear set 39.

As FIG. 4B shows, such an axle drive 11 may also be connected to an axle chamber 98 to install the axle drive 11. Provision may generally also be made with a multi-part drive shaft 15, comprising two part shafts 41 and 43 connected via a reduction gear unit 45, to arrange the brake disk 37, as shown in FIGS. 1, 2A and 2B, at a second end 31 of the driven shaft 27 extending from the housing 55.

The design of an axle drive 11 in accordance with the invention consequently enables different variants to integrate a brake 35 having a parking brake function into an axle drive 11 in a compact manner and to connect the axle drive 11 to a vehicle axle 13. The axle drive 11 may thus be used without problem also in view of the small installation space available in the region of the vehicle axle 13 in order, on the one hand, to be able to transmit drive power to the vehicle axle 13 and, on the other hand, to be able to provide a reliable brake 35 for fixedly holding the vehicle at a standstill, for example a commercial vehicle during a loading.

REFERENCE NUMERAL LIST 11 axle drive
13 vehicle axle
15 drive shaft
17 first side of the axle drive
19 second side of the axle drive
21 input section
23 electric motor
25 output section
26 first end of the drive shaft
27 driven shaft
28 second end of the drive shaft
29 first end of the driven shaft
30 input section of the driven shaft
31 second end of the driven shaft
33 bevel gear
35 brake
37 brake disk
39 spur gear set
41 first part shaft of the drive shaft
43 second part shaft of the drive shaft
45 reduction gear unit
47 ring gear
49 sun gear
51 planet gear
53 web
55 housing
57 inner space of the housing
59 common oil chamber
61 axle chamber
63 ring gear
65 bearing section
67 bearing
69 axle chamber housing section
71 connection section
73 differential
74 differential cage
75 first half-shaft of the vehicle axle
77 second half-shaft of the vehicle axle
79 brake caliper
81 outer side of the housing
83 balancing gear
84 side gear
85 planetary gear set
87 ring gear
89 sun gear
91 planet gear
93 web
95 wheel hub
97 wheel side
98 axle housing
L longitudinal direction

The invention claimed is:

1. An axle drive for a vehicle, the vehicle comprising at least one drivable vehicle axle oriented transversely to a longitudinal direction of the vehicle, said axle drive comprising a drive shaft that extends along the longitudinal direction of the vehicle, starting from a first side of the axle drive, across the vehicle axle to a second side of the axle drive, wherein the drive shaft is configured to receive drive power at an input section from an electric motor arranged at the first side of the axle drive and to output the drive power at the second side of the axle drive via an output section;

a driven shaft that extends at the second side of the axle drive offset from the drive shaft and to parallel to the longitudinal direction of the vehicle between a first end and a second end, the second end being opposite to the first end, wherein the first end of the driven shaft faces towards the first side of the axle drive, and wherein the driven shaft is configured to receive drive power at an input section from the output section of the drive shaft and to output said drive power to the vehicle axle via a bevel gear arranged at the first end of the driven shaft; and a brake comprising a brake disk that is rotatable around an axis parallel to the longitudinal direction and that is arranged at the second side of the axle drive, in a manner facing away from the first side of the axle drive, at the drive shaft or at the driven shaft.

2. The axle drive in accordance with claim 1, wherein the axle drive further comprises the electric motor.

3. The axle drive in accordance with claim 1, wherein the output section of the drive shaft and/or the input section of the driven shaft is/are arranged between the first end of the driven shaft and the brake disk with respect to the longitudinal direction.

4. The axle drive in accordance with claim 1 wherein the output section of the drive shaft and the input section of the driven shaft are coupled to one another such that a speed reduction takes place on the transmission of the drive power from the drive shaft to the driven shaft.

5. The axle drive in accordance with claim 1, wherein the output section of the drive shaft and the input section of the driven shaft are coupled to one another via at least one spur gear set.

6. The axle drive in accordance with claim 1,
wherein the brake disk is arranged at the second end of the driven shaft.

7. The axle drive in accordance with claim 6,
wherein the second end of the driven shaft projects axially beyond the drive shaft with respect to the longitudinal direction of the vehicle, wherein the brake disk extends in a radial direction at least up to an alignment with the drive shaft.

8. The axle drive in accordance with claim 1,
wherein the drive shaft extends along the longitudinal direction of the vehicle between a first end and a second end, the second end being opposite to the first end of the drive shaft, wherein the first end of the drive shaft faces towards the first side of the axle drive, wherein the brake disk is arranged at the second end of the drive shaft.

9. The axle drive in accordance with claim 1,
wherein the drive shaft comprises at least a first part shaft and a second part shaft, the second part shaft being coaxial to the first part shaft, wherein the first part shaft and the second part shaft are drive-effectively coupled via a reduction gear unit arranged between the first part shaft and the second part shaft.

10. The axle drive in accordance with claim 1,
wherein the axle drive is configured to be installed in the vehicle such that the drive shaft is arranged vertically offset from the driven shaft and crosses the vehicle axle above the vehicle axis.

11. The axle drive in accordance with claim 1,
wherein the axle drive comprises a housing in which the drive shaft and the driven shaft are received, wherein the output section of the drive shaft and the input section of the driven shaft are arranged within the housing.

12. The axle drive in accordance with claim 11,
wherein an inner space of the housing forms a common oil chamber for the drive shaft and the driven shaft.

13. The axle drive in accordance with claim 12,
wherein the axle drive is configured such that the common oil chamber communicates with an axle chamber in which a ring gear meshing with the bevel gear is arranged.

14. The axle drive in accordance with claim 11,
wherein the housing has a bearing section which is integrally formed in one part and at which bearings for supporting at least one of the drive shaft or the driven shaft is supported, and wherein the housing has an axle chamber housing section which is connected to the bearing section, wherein at least one of the bevel gear or a ring gear meshing with the bevel gear is received in the axle chamber housing section.

15. The axle drive in accordance with claim 14,
wherein the output section of the drive shaft and the input section of the driven shaft are arranged within the bearing section.

16. The axle drive in accordance with claim 14,
wherein the input section of the drive shaft is arranged within the axle chamber housing section or is arranged at the axle chamber housing section.

17. The axle drive in accordance with claim 14,
wherein the drive shaft passes through the axle chamber housing section.

18. The axle drive in accordance with claim 14,
wherein at least one bearing for supporting the drive shaft is supported at the axle chamber housing section.

19. The axle drive in accordance with claim 11,
wherein the housing has a connection section for fastening the electric motor.

20. The axle drive in accordance with claim 1,
wherein the axle drive further comprises a differential for distributing at least a respective portion of the drive power to two half-shafts of the vehicle axle, and wherein a ring gear meshing with the bevel gear is rotationally fixedly coupled to the differential.

21. The axle drive in accordance with claim 11,
wherein the brake disk is arranged outside the housing.

22. The axle drive in accordance with claim 11,
wherein the brake comprises a brake caliper that is fastened to an outer side of the housing.

23. The axle drive in accordance with claim 22,
wherein the brake caliper is floatingly supported at the housing.

* * * * *